Figure 1:
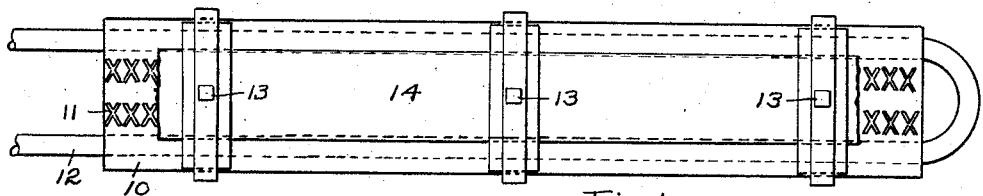

A. J. ROUSSEY.
PROCESS OF MANUFACTURING VEHICLE TIRES.
APPLICATION FILED JUNE 3, 1921.

1,389,221.  Patented Aug. 30, 1921.

INVENTOR
Amos J. Roussey
BY Elwin M. Hulse
ATTORNEY

UNITED STATES PATENT OFFICE.

AMOS J. ROUSSEY, OF FORT WAYNE, INDIANA.

PROCESS OF MANUFACTURING VEHICLE-TIRES.

1,389,221.  Specification of Letters Patent.  Patented Aug. 30, 1921.

Application filed June 3, 1921. Serial No. 474,845.

*To all whom it may concern:*

Be it known that I, AMOS J. ROUSSEY, a citizen of the United States, residing at Fort Wayne, in the county of Allen and State of Indiana, have invented new and useful Improvements in Processes of Manufacturing Vehicle-Tires, of which the following is a specification.

The invention relates to the manufacture of vehicle tires and particularly to the manufacture of the type of tires commonly known as "wrapped tread" tires.

Heretofore the desired patterns or configurations have been applied to the treads of vehicle tires by placing the raw tread on the fabric body and inserting the whole into a circular form or mold having the configurations formed on its inner face. An air bag is inserted within the body and filled with air under pressure to force the tread into the mold. The air bag is expensive and has but short life. Another method is to construct a sectional circular mold, insert the body with raw tread thereon into the mold and apply hydraulic pressure externally to the mold to force the same on to the tread. Here the tread frequently enters the joints between the sections of the mold, the fabric following the tread into said joints. When the tire thus made up is vulcanized the presence of the fabric in the tread produces a defective tire. The apparatus to produce the external pressure is very expensive.

The object of my invention is to produce a tread in a most inexpensive manner, eliminating the use of an air bag and a sectional mold and all apparatus to place external pressure upon the body and tread of the tire in order to secure the desired configurations on the tread.

I accomplish the invention by impressing the desired configurations on the raw tread without vulcanizing it and without assembling it on the tire body or carcass and then in one operation vulcanize the tire body and tread together.

In carrying out my method I form a flat metallic mold of suitable length having therein the desired configurations for the tread and arrange adjacent thereto suitable means for heating it, such as a steam line or coil. I then build up the tread of desired thickness and length out of rubber and place it on the mold; then apply sufficient pressure to the tread to cause it when softened by the heat of the mold to enter the depressions in the mold, the heat being insufficient to vulcanize the tread. After about seven minutes the tread is removed from the mold, the material of the mold being such that the rubber will not stick to it but will readily separate from it. The pattern of the mold is thereby applied to the tread in clear and distinct manner. The body or raw carcass of the tire has been built up of rubberized fabric in the usual manner. This carcass is placed on a circular or wheel like form and the tread is placed thereon in proper alinement therewith. The depressions in the tread are filled with a suitable paste and a tape is wrapped around the tread, body and rim of the form to hold the tread firmly in place on the body. The whole is then inserted in a suitable heater for curing or vulcanizing. When fully vulcanized the article is removed from the heater, the tape is removed and the paste taken out of the indentations of the tread and the completed tire is removed from the form.

The operations are very quickly performed and the completed tire has a tread free from defects and having the design therein clear cut. One vulcanization only of the tire is required and the expensive air bag or external pressure producing apparatus is eliminated, thus accomplishing a large saving in equipment and labor and time.

In the accompanying drawings I have illustrated a simple means by which the invention may be practised, in which—

Figure 2:
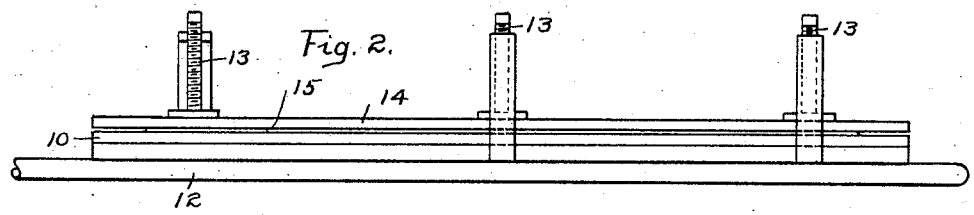
Figure 3:
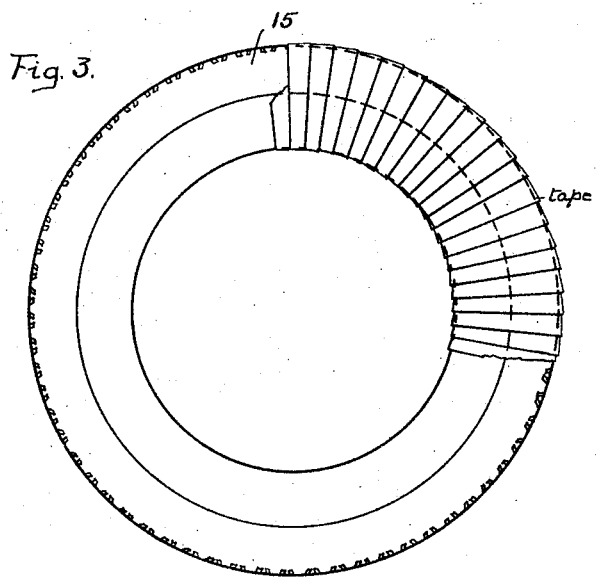
Figure 4:
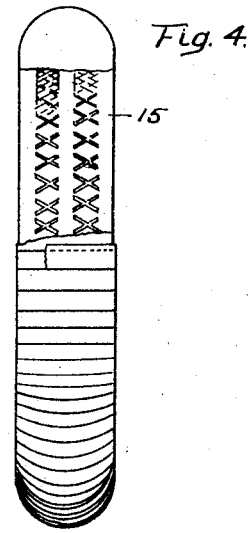

Figure 1 is a plan view of a mold, by which selected configurations may be applied to the tread; Fig. 2 an elevational view of the same; Fig. 3 a side elevational view of the tread installed on the tire body or carcass ready for vulcanization and Fig. 4 an end elevational view of the same.

In the drawings, 10 indicates the flat mold having any desired pattern 11 formed therein. 12 indicates a steam pipe to heat the mold. 13 are screws or jacks by which pressure is applied to a block 14 placed on the raw tread 15. By tightening the screws the block is forced down on the tread to press the latter into the mold as the tread is softened by the heated mold. Any desirable means for pressing the raw tread onto the mold will suffice for my purposes.

What I claim is:

1. The process of forming tire treads consisting in pressing the tread in a raw state upon a slightly heated flat mold; then applying the tread to a tire body or raw carcass and securing the same thereon and then subjecting the said body and tread to a vulcanizing heat.

2. The process of forming tire treads consisting in pressing the tread in a raw state upon a slightly heated flat mold formed of metal; then applying the tread to the periphery of a raw tire carcass and securing the same thereon by tape and finally subjecting the carcass and tread to a vulcanizing heat.

3. The process of forming tire treads consisting in pressing the tread in a raw state upon a heated flat mold having thereon the desired pattern or configurations to form said pattern upon said tread; then applying the tread to the periphery of a raw tire carcass and wrapping a tape about the tread and carcass to hold the tread in proper position on the carcass and finally subjecting the tread and carcass to a vulcanizing heat.

In witness whereof I have hereunto subscribed my name this 1st day of June, 1921.

AMOS J. ROUSSEY.